(12) United States Patent
Mizuno et al.

(10) Patent No.: US 8,721,933 B2
(45) Date of Patent: May 13, 2014

(54) OPTICAL SHEET MANUFACTURE METHOD AND OPTICAL SHEET

(75) Inventors: Hiroshi Mizuno, Miyagi (JP); Akihiro Horii, Miyagi (JP); Noriyuki Hirai, Miyagi (JP); Masashi Ogawa, Miyagi (JP); Yuu Miura, Miyagi (JP); Kei Obata, Miyagi (JP); Makoto Aoki, Miyagi (JP)

(73) Assignee: Dexerials Corporation, Tokyo (JP)

( * ) Notice: Subject to any disclaimer, the term of this patent is extended or adjusted under 35 U.S.C. 154(b) by 906 days.

(21) Appl. No.: 12/047,233

(22) Filed: Mar. 12, 2008

(65) Prior Publication Data
US 2008/0223510 A1    Sep. 18, 2008

(30) Foreign Application Priority Data

Mar. 16, 2007 (JP) ................... 2007-069639
Jan. 31, 2008 (JP) ................... 2008-021860

(51) Int. Cl.
*B29D 11/00* (2006.01)

(52) U.S. Cl.
USPC ............................................. 264/2.7; 264/1.1

(58) Field of Classification Search
USPC ................... 264/1.1, 1.34, 1.6, 2.7; 425/373
See application file for complete search history.

(56) References Cited

U.S. PATENT DOCUMENTS 4,486,363 A * 12/1984 Pricone et al. ............... 264/1.36
5,958,309 A *  9/1999 Fujii et al. ..................... 264/1.6
2003/0102591 A1 *  6/2003 Thielman et al. ............. 264/166
2004/0130057 A1 *  7/2004 Mehrabi et al. .......... 264/171.13
2005/0003939 A1 *  1/2005 Womer et al. .................. 492/46
2005/0244614 A1 * 11/2005 Bharadwaj et al. ........... 428/167
2006/0138702 A1     6/2006 Biernath et al.
2006/0204720 A1 *  9/2006 Biernath et al. .............. 428/156
2006/0214319 A1 *  9/2006 Kazama ....................... 264/1.34

FOREIGN PATENT DOCUMENTS

| JP | 59-140021 | 8/1984 |
| JP | 06-114866 | 4/1994 |
| JP | 09-295346 | 11/1997 |
| JP | 10-034744 | 2/1998 |
| JP | 10-265747 | 10/1998 |
| JP | 10-291251 | 11/1998 |

(Continued)

OTHER PUBLICATIONS

Li et al. "Isothermal and nonisothermal crystallization kinetics of elastomeric polypropylene" Polymer Testing 21 (2002) 583-589.*

(Continued)

*Primary Examiner* — Galen Hauth
(74) *Attorney, Agent, or Firm* — Oliff PLC

(57) ABSTRACT

A manufacture method of an optical sheet made of a transparent thermoplastic resin sheet on whose surface a regular geometric design working is performed, the optical sheet manufacture method comprising steps of performing a geometric design working on the resin sheet at a temperature not lower than a glass transition temperature of the resin sheet, by using a metal endless working belt formed with a geometric design on a surface thereof, rapidly cooling the resin sheet on which the geometric design working is performed to a temperature lower than the glass transition temperature, and detaching the rapidly cooled resin sheet from the metal endless working belt.

17 Claims, 9 Drawing Sheets

(56) References Cited

FOREIGN PATENT DOCUMENTS

| | | |
|---|---|---|
| JP | 2001-179883 | 7/2001 |
| JP | 2001-077354 | 10/2001 |
| JP | 2001-277354 | 10/2001 |
| JP | 2003-011218 | 1/2003 |
| JP | A-2008-260268 | 10/2008 |
| WO | 2006/071616 | 7/2006 |
| WO | 2006-071621 | 7/2006 |

OTHER PUBLICATIONS

Calleja et al., "Structure development in poly(ethylene terephthalate) quenched from the melt at high cooling rates: X-ray scattering and microhardness study", Polymer 41 p. 4143-4148, 2000.*

Martin et al., "Effect of draw ratio and temperature on the strain induced crystallization of poly(ethylene terephthalate) at fast draw rates", Polymer 40 p. 5553-5565, 1999.*

Japanese Office Action issued on Jan. 27, 2009, for corresponding Japanese Patent Application JP 2008-021860.

* cited by examiner

F I G . 6
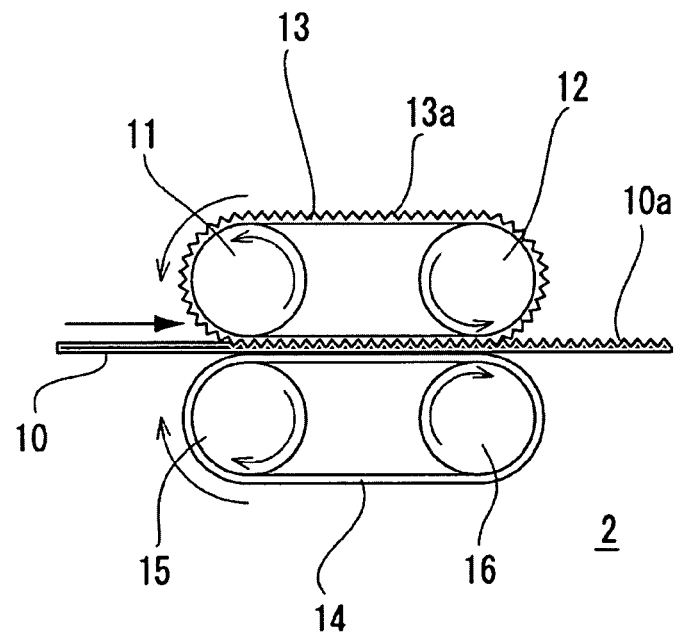
F I G . 7
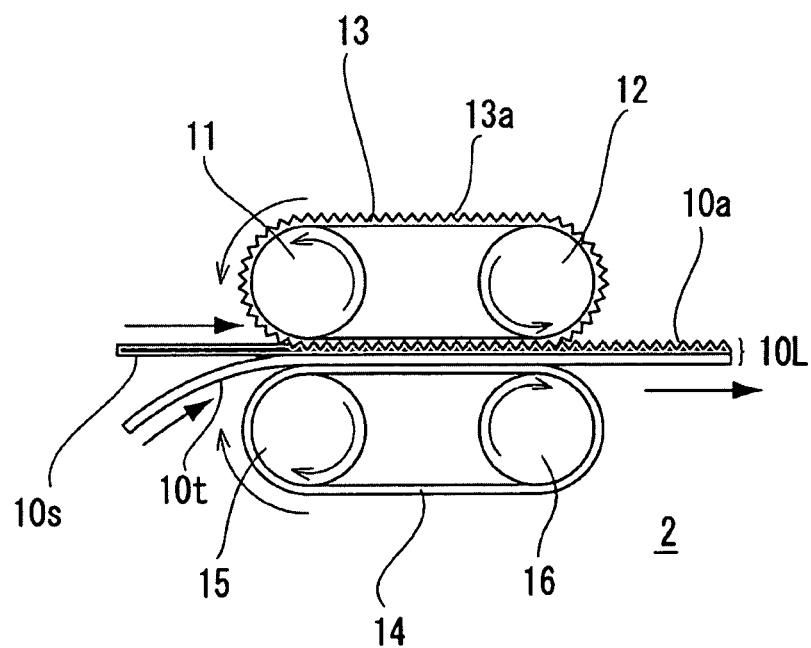

FIG. 10

| EXAMPLE | SHEET | THICKNESS (μm) | PITCH (μm) | ROLL TEMPERATURE(°C) | | | | L/S (m/min) | COOLING SPEED (°C/second) | NIP LINE PRESSURE (kg/cm) |
|---|---|---|---|---|---|---|---|---|---|---|
| | | | | 11 | 15 | 12 | 16 | | | |
| EXAMPLE 1 | AMORPHOUS PET | 200 | 50 | 150 | 50 | 30 | 30 | 5 | 20 | 15 |
| EXAMPLE 2 | AMORPHOUS PEN | 200 | 100 | 190 | 70 | 30 | 30 | 3 | 10 | 15 |
| EXAMPLE 3 | AMORPHOUS PEN | 200 | 300 | 190 | 70 | 30 | 30 | 3 | 10 | 15 |
| EXAMPLE 4 | AMORPHOUS PEN | 200 | 10 | 190 | 70 | 30 | 30 | 3 | 10 | 15 |
| EXAMPLE 5 | AMORPHOUS PET | 500 | 100 | 150 | 50 | 30 | 30 | 5 | 15 | 15 |
| EXAMPLE 6 | AMORPHOUS PET | 20 | 20 | 150 | 50 | 30 | 30 | 5 | 30 | 30 |
| EXAMPLE 7 | AMORPHOUS PEN | 200 | 50 | 200 | 70 | 50 | 50 | 5 | 40 | 30 |
| EXAMPLE 8 | AMORPHOUS PEN | 150 | 100 | 180 | 70 | 30 | 30 | 5 | 30 | 30 |
| EXAMPLE 9 | AMORPHOUS PEN | 200 | 350 | 190 | 70 | 30 | 30 | 3 | 10 | 15 |
| EXAMPLE 10 | AMORPHOUS PEN | 300 | 75 | 190 | 70 | 30 | 30 | 4 | 10 | 5 |
| EXAMPLE 11 | AMORPHOUS PEN | 100 | 100 | 150 | 50 | 30 | 30 | 5 | 25 | 5 |
| EXAMPLE 12 | AMORPHOUS PEN | 100 | 100 | 150 | 50 | 30 | 30 | 2 | 6 | 20 |
| EXAMPLE 13 | AMORPHOUS PEN | 300 | 50 | 190 | 80 | 60 | 60 | 3 | 5 | 20 |
| COMPARATIVE EXAMPLE 1 | AMORPHOUS PET | 200 | 100 | 170 | 40 | 30 | 30 | 4 | 3 | 15 |
| COMPARATIVE EXAMPLE 2 | AMORPHOUS PEN | 200 | 100 | 170 | 60 | 30 | 30 | 5 | 20 | 15 |
| COMPARATIVE EXAMPLE 3 | AMORPHOUS PEN | 560 | 200 | 190 | 80 | 30 | 30 | 2 | 3 | 15 |
| COMPARATIVE EXAMPLE 4 | AMORPHOUS PET | 200 | 50 | 150 | 40 | 30 | 30 | 4 | 10 | 3 |
| COMPARATIVE EXAMPLE 5 | AMORPHOUS PET | 200 | 50 | 150 | 40 | 30 | 30 | 4 | 10 | 35 |
| COMPARATIVE EXAMPLE 6 | AMORPHOUS PET | 200 | 50 | 150 | 40 | 80 | 80 | 3 | 10 | 15 |
| COMPARATIVE EXAMPLE 7 | AMORPHOUS PET | 100 | 185 | 150 | 40 | 50 | 50 | 3 | 10 | 15 |
| COMPARATIVE EXAMPLE 8 | AMORPHOUS PET | 200 | 50 | MELT EXTRUSION TRANSFER | | | | | | |

FIG. 11

| EXAMPLE | TRANSFER RATE (%) | APEX ANGLE (μm) | PRISM RATIO (%) | CRYSTALLIZATION RATE (%) | FRONT LUMINANCE RISE RATE (%) | JUDGMENT |
|---|---|---|---|---|---|---|
| EXAMPLE 1 | 99.5 | 2.0 | 12.5 | 8.0 | 191 | ◎ |
| EXAMPLE 2 | 99.4 | 1.3 | 25.0 | 5.0 | 190 | ◎ |
| EXAMPLE 3 | 99.9 | 9.0 | 75.0 | 5.0 | 191 | ◎ |
| EXAMPLE 4 | 99.2 | 0.3 | 2.5 | 5.0 | 190 | ◎ |
| EXAMPLE 5 | 99.7 | 3.5 | 10.0 | 15.0 | 185 | ○ |
| EXAMPLE 6 | 99.6 | 0.6 | 50.0 | 5.6 | 194 | ◎ |
| EXAMPLE 7 | 99.9 | 0.4 | 12.5 | 18.8 | 188 | ○ |
| EXAMPLE 8 | 99.0 | 2.2 | 33.0 | 3.0 | 185 | ○ |
| EXAMPLE 9 | 99.0 | 12.0 | 87.5 | 4.0 | 185 | ○ |
| EXAMPLE 10 | 98.5 | 3.5 | 12.5 | 7.2 | 182 | ○ |
| EXAMPLE 11 | 98.8 | 4.4 | 50.0 | 7.5 | 180 | ○ |
| EXAMPLE 12 | 99.5 | 1.8 | 50.0 | 18.0 | 182 | ○ |
| EXAMPLE 13 | 99.8 | 2.5 | 8.3 | 20.0 | 180 | ○ |
| COMPARATIVE EXAMPLE 1 | 99.8 | 1.5 | 25.0 | 25.0 | 175 | × |
| COMPARATIVE EXAMPLE 2 | 97.5 | 7.0 | 24.3 | 2.0 | 176 | × |
| COMPARATIVE EXAMPLE 3 | 99.3 | 7.5 | 13.9 | 28.0 | 176 | × |
| COMPARATIVE EXAMPLE 4 | 96.0 | 3.5 | 12.0 | 10.0 | 175 | × |
| COMPARATIVE EXAMPLE 5 | | | × | | | × |
| COMPARATIVE EXAMPLE 6 | | | × | | | × |
| COMPARATIVE EXAMPLE 7 | | | × | | | × |
| COMPARATIVE EXAMPLE 8 | 73.0 | 12.0 | 18.3 | 6.0 | 150 | × |

OPTICAL SHEET MANUFACTURE METHOD AND OPTICAL SHEET

CROSS-REFERENCES TO RELATED APPLICATIONS

The present application claims priority to Japanese Patent Application No. 2007-069639 filed in the Japanese Patent Office on Mar. 16, 2007, and Japanese Patent Application No. 2008-021860 filed in the Japanese Patent Office on Jan. 30, 2008, the entire content of which being incorporated herein by reference.

BACKGROUND

The present application relates to a method of manufacturing an optical sheet made of an amorphous state transparent crystalline resin sheet whose surface is subject to emboss processing.

A so-called emboss sheet has been manufactured which is a resin sheet or film whose surface is formed with a regular steric geometric design (emboss pattern). Typically, a melt extrusion method is widely used in which thermoplastic resin melt is pushed out of a T die in a sheet shape, the melt sandwiched and compressed between a metal roll having a concave/convex shape on the circumference surface thereof and a rubber roll is cooled and solidified so that a sheet having a concave/convex shapes on a surface and a flat rear surface is continuously formed (e.g., refer to Japanese Patent Unexamined Publication No. HEI-9-295346, Patent Document 1).

With the melt extrusion method, transfer and detach are performed at the same time for resin pushed out of the T die by using the same solid roll having a geometric shape. To make transfer perfect, it is necessary that resin has sufficient thermal energy, and to perform detachment, it is necessary that the resin is cooled down to not higher than a glass transition temperature (Tg) of the resin. Since the melt extrusion method makes transfer and cooling by using the same solid roll, sufficient heating and cooling is difficult to be performed and it is difficult to perform both transfer and detachment perfectly.

According to another emboss sheet manufacture method, an emboss pattern formed on the surface of a metal roll or a metal flat plate is transferred to the surface of a resin sheet. According to another known method, an emboss pattern is formed on the surface of a resin sheet by using a metal endless working belt wound around a plurality of rolls and having the emboss pattern formed on the surface of the endless belt (e.g., refer to Japanese Patent Unexamined Publication No. 2001-277354, Patent Document 2).

An emboss sheet manufactured in the manner described above can be used, for example, as an optical sheet for a liquid crystal display apparatus. Specifically, a prism sheet in which a prism shape of a triangle shape in section disposed consecutively can be used as the emboss sheet. The prism sheet is widely known as a luminance improving sheet (film) for improving a front luminance by converging backlight. For example, WO2006/071621 Publication (Patent Document 3) discloses a prism sheet having in-plane anisotropy of a refractive index and formed by stretching a resin sheet having a prism shape on the surface thereof.

It may be required to form an amorphous state resin sheet having an emboss pattern on the surface thereof. In order to make an emboss sheet subject to shape processing have in-plane anisotropy of a reflective index, a crystalline resin sheet is typically stretched along a uniaxial direction or biaxial directions. In this case, it is preferable that a crystalline resin sheet is in an amorphous state so that a stretching process can be executed properly at a higher precision.

However, with the related art emboss sheet manufacture methods described above, it is very difficult to execute an embossing processing while the resin sheet is maintained in the amorphous state. Namely, with the related art emboss sheet manufacture methods, it is not possible to prevent resin from being crystallized during a cooling process in which the temperature of the resin sheet is lowered down to a detachment temperature after the resin sheet is formed with the emboss pattern by raising the temperature higher than the glass transition temperature or in the vicinity of crystallization temperature range. As crystallization of the resin sheet precedes, resin is whitened and its transparency is lost, and consequently the resin sheet becomes not suitable for use as the optical sheet. If an emboss pattern transfer temperature is low or a detachment temperature is high, it is not possible to obtain a high emboss pattern transfer precision.

SUMMARY

According to an embodiment, there is provided an optical sheet manufacture method capable of preventing whitening by crystallization of a resin sheet, while obtaining a high precision of an emboss pattern.

According to an embodiment, an optical sheet manufacture method is the manufacturing method of an optical sheet made of a transparent thermoplastic resin sheet whose surface is subject to a regular geometric design processing. The optical sheet manufacture method includes steps of forming a geometric design on the resin sheet at a temperature not lower than a glass transition temperature of the resin sheet, by using a metal endless working belt formed with a geometric design on the surface thereof, rapidly cooling the resin sheet formed with the geometric design to a temperature lower than the glass transition temperature, and detaching the rapidly cooled resin sheet from the metal endless working belt.

In an embodiment, the resin sheet is subject to the geographic design (emboss shape) processing at the temperature higher than the glass transition temperature of the resin sheet, and thereafter the resin sheet is rapidly cooled to the temperature lower than the glass transition temperature or crystallization temperature range to suppress crystallization of the resin sheet. Also in an embodiment, the emboss processing is performed to the resin sheet by using the metal endless working belt, thereafter the resin sheet in combination with the metal endless working belt is cooled between the transfer process and the cooling process, and the resin sheet is detached from the metal endless working belt at the temperature lower than the glass transition temperature of the resin sheet. Thus, emboss shape transfer performance and detach performance of the resin sheet is improved.

In order to prevent crystallization of the amorphous state resin sheet, an important matter is a cooling speed of the resin sheet to a temperature not higher than the glass transition temperature of the resin sheet, after the emboss shape is transferred. Although depending upon the material used for the resin sheet, the cooling speed is set, for example, not slower than 5° C./sec and not faster than 40° C./sec. If the cooling speed is slower than 5° C./sec, it is not possible to prevent excessive crystallization of the resin sheet, resulting in whitening (lost transparency). If the cooling speed is set faster than 40° C./sec, emboss working is degraded and it becomes difficult to obtain a shape transfer.

A crystallinity of the resin sheet when the resin sheet is detached from the metal endless working belt is set not higher than 20% and preferably not higher than 5%. If the crystallinity of the resin sheet exceeds 20%, transparency is lowered considerably by whitening, and the resin sheet becomes unsuitable for use as an optical sheet.

The geographic design (emboss shape) formed on the surface of resin sheet is not limited particularly, but may be a shape having at least one corner (sharp edge) such as a prism shape, a rectangle wave shape and a trapezoid shape. Even the emboss shape having at least one corner can be transferred at a high transfer rate. Although an apex angle of the prism shape is set to be, for example, 90°, it may be an acute angle smaller than 90° or an obtuse angle larger than 90°. The emboss shape may be a lens shape.

The material of the resin sheet is not specifically limited, as long as it is a transparent thermoplastic resin. PET. PEN, mixture or copolymer of these is used preferably. In order to stably retain the cooling speed, the total thickness of the resin sheet may be set to be 500 μm or thinner, for example. A ratio of the emboss shape height to the total thickness of the resin sheet is, for example, 90% or lower. If the height ratio exceeds 90%, cracks or the like are caused in the resin sheet, thereby lowering handling performance. The resin sheet may be an elongate swathe or a sheet cut in a predetermined size.

The material of the metal endless working belt may be stainless steel, nickel steel and the like. In an embodiment, it is preferable that the resin sheet is adhered to the metal endless working belt, and each of the heating, pressing and cooling processes are executed while the resin sheet is moved together with the metal endless working belt. As a method of adhering the resin sheet to the metal endless working belt, for example, there is a method of tightly attaching the resin sheet to a belt by heating the resin sheet on the metal endless belt up to a softening temperature (a temperature not lower than the glass transition temperature) of the resin sheet. With this method, manufacture facilities can be simplified and manufacture cost can be reduced. Since the emboss sheet can be manufactured continuously, a manufacture efficiency can be improved.

During the heating process, for example, heating is started from the inside of the metal endless working belt. By start heating from inside of the belt, the sheet adhered to the heated endless working belt can be directly heated to improve a heating efficiency. As a mean for start heating from inside the metal endless working belt, a method in which roll around which the belt is wound is used as heating roll, is most effective. In addition to the above, there is a method in which heating is performed by an electric heater provided in the roll or a method in which heated oil circulated in the roll. According to cooling means, cooling water flows inside the metal roll. Supplementary heating by an external infrared heater or supplementary cooling by an air flow may also be possible.

In an embodiment, the metal endless working belt is wound around the heating roll set to a temperature higher than the glass transition temperature of the resin sheet and the cooling roll set to a temperature lower than the glass transition temperature of the resin sheet, and the belt is fed synchronously with the rotation of the heating roll and cooling roll. In accordance with the cooling speed necessary for preventing crystallization of the resin sheet, temperatures of the heating roll and cooling roll, an inter-roll distance and a line speed (transport speed of the metal endless working belt) is set.

The in-plane temperature uniformity of the metal endless working belt largely influences a working precision of the shape to be transferred on the surface of the resin sheet. In an embodiment, a roll temperature of the central portion of the heating roll is set to be higher than opposite end portions, and a roll temperature of the central portion of the cooling roll is set to be lower than opposite end portions. It is therefore possible to improve an in-plane temperature uniformity of the metal endless working belt and manufacture an emboss sheet having an excellent morphology precision.

The emboss processing is performed on the resin sheet by supplying the resin sheet between the nip roll disposed by facing the heating roll and the metal endless working belt. In this case, if a nip pressure between the metal endless working belt and nip roll is low, an emboss shape transfer precision is lowered, whereas if the nip pressure is high, durability of the nip roll is adversely affected and stable production becomes difficult. A preferred nip pressure is not lower than line pressure of 5 kg/cm and not higher than 30 kg/cm.

If the feed speed of the metal endless working belt is increased in order to increase the cooling speed of the resin sheet, running performance of the resin sheet becomes unstable or sufficient preheating cannot be obtained, and thereby lowering feed performance. The endless belt is wound around the nip roll and the opposing roll facing the cooling roll, and the resin sheet is fed by being sandwiched between the endless belt and the metal endless working belt. It is therefore possible to improve running stability of the resin sheet and the feed speed.

As described above, according to the optical sheet manufacture method, it becomes possible to form a desired emboss shape on the surface of a crystalline resin sheet at a high transfer rate, while preventing the sheet from being whitened due to crystallization.

Additional features and advantages are described herein, and will be apparent from the following Detailed Description and the figures.

BRIEF DESCRIPTION OF THE FIGURES

FIG. 6 is a diagram showing the outline structure of a sheet manufacture apparatus used for an optical sheet manufacture method according to a second embodiment.

FIG. 7 is a diagram explaining an optical sheet manufacture method according to a third embodiment;

FIG. 10 is a table showing the results of examples according to an embodiment; and FIG. 11 is a table showing the results of examples an embodiment.

DETAILED DESCRIPTION

The present application will be described below with reference to the accompanying drawings according to an embodiment.

Figure 1:
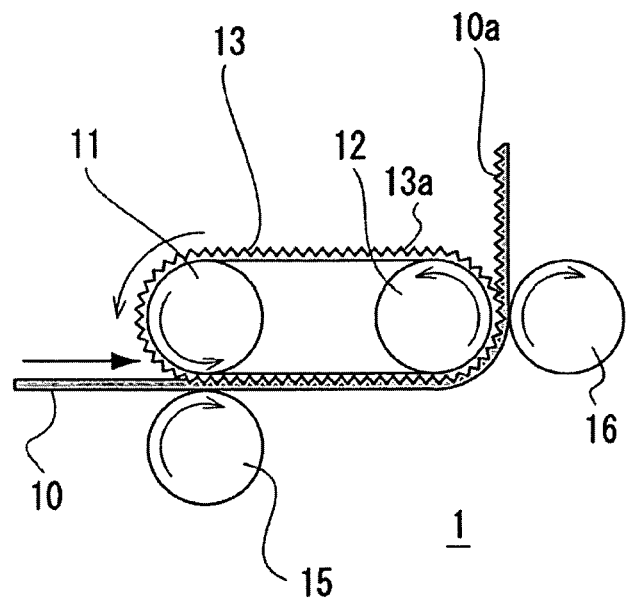
FIG. 1 is a diagram showing the outline structure of a sheet manufacture apparatus used for an optical sheet manufacture method according to a first embodiment.

FIG. 1 is a diagram showing the outline structure of a sheet manufacture apparatus 1 for explaining an optical sheet manufacture method according to the first embodiment.

The sheet manufacture apparatus 1 has a heating roll 11 and a cooling roll 12 disposed spaced apart by a predetermined distance, an emboss belt 13 wound around the rolls 11 and 12, a nip roll 15 disposed by facing the heating roll 11, and an opposing roll (backup roll) 16 disposed by facing the cooling roll 12.

The sheet manufacture apparatus 1 feeds a transparent amorphous crystalline resin sheet 10 synchronously with the emboss belt 13 between the emboss belt 13 and nip roll 15, and presses the resin sheet against the emboss belt while the resin sheet is heated up to a temperature not lower than a glass transition temperature by the heating roll 11, and thereby transferring the emboss shape of the emboss belt 13 on the surface of the resin sheet 10. The resin sheet 10 is moved in the state that the resin sheet is adhered to the emboss belt 13, rapidly cooled with the cooling roll 12, and detached from the emboss belt 13 to manufacture a transparent amorphous crystalline resin sheet 10 formed with an emboss shape (prism pattern) 10a having a predetermined shape on the surface.

The heating roll 11 has a built-in heating means such as a heater, and its surface temperature is set to a temperature higher than a softening temperature of the resin sheet 10, i.e., a temperature higher than the glass transition temperature of the resin sheet 10. Therefore, a portion positioned above the heating roll 11 of the emboss belt 13 is also heated to this temperature so that the heating process for the resin sheet 10 can be executed at this position.

In the present embodiment, the surface temperature of the heating roll 11 is set in a temperature range not lower than Tg+60° C. and not higher than Tg+90° C., when Tg (° C.) is a glass transition temperature of the resin sheet 10. If the set temperature is lower than Tg+60° C., a high transfer precision of the emboss pattern to the resin sheet 10 cannot be obtained. If the set temperature is higher than Tg+90° C. and if the resin sheet 10 is made of crystalline resin which is difficult to maintain in the amorphous state, crystallization of the resin sheet 10 is accelerated excessively, and degradation of transparency caused by whitening becomes prominent.

The cooling roll 12 has a built-in cooling means such as a water cooling system, and its surface temperature is set to be a temperature lower than the glass transition temperature of the resin sheet 10. In the present embodiment, a surface temperature of the cooling roll 12 is set to be 30° C. Thus, a portion positioned above the cooling roll 12 of the emboss belt 13 is also cooled so that the cooling process for the resin sheet 10 at the position can be executed.

Figure 8A:
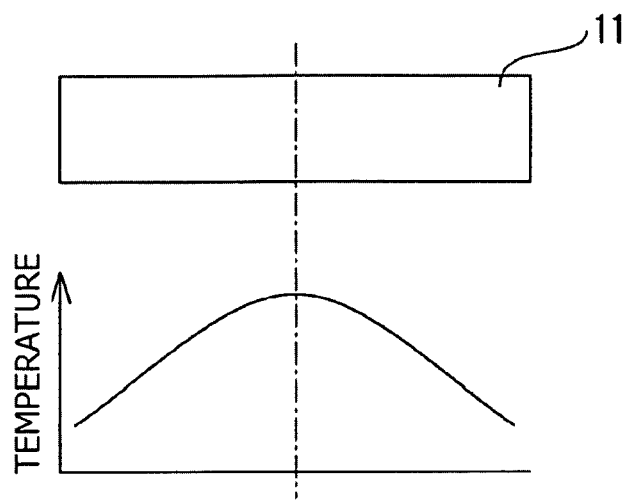
FIGS. 8A and 8B are diagrams showing temperature distributions of a heating roll and a cooling roll.
Figure 8B:
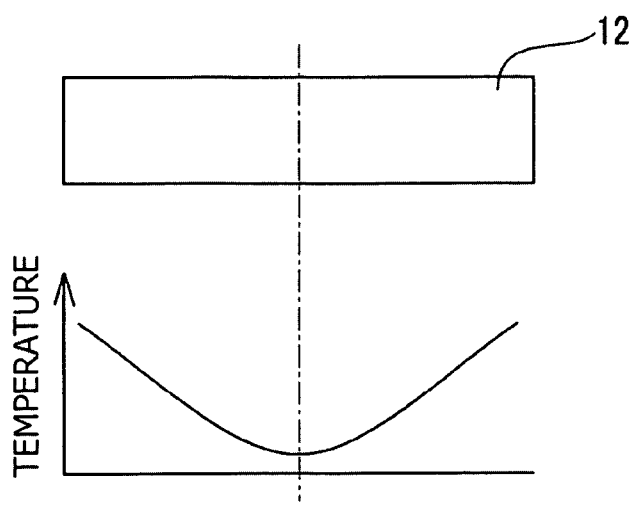

In the present embodiment, as shown in FIG. 8A, a roll temperature of the central position of the heating roll 11 is set to be higher than opposite end portions. On the other hand, as shown in FIG. 8B, a roll temperature of the central position of the cooling roll 12 is set to be lower than opposite end portions. It is therefore become possible to improve an in-plane temperature uniformity of the emboss belt and manufacture an emboss sheet having an excellent morphology precision. In a method for realizing this temperature distribution, if a heating source for the heating roll 11 is constituted of an electric heater, the number of winds of electric wires at the central position of the roll is larger than opposite roll end portions.

At least one of the heating roll 11 and cooling roll 12 is adapted to be rotatable by being coupled to a rotation driving means such as a motor.

The emboss belt 13 corresponds to a "metal endless working belt" of the present invention which is made of a metal endless belt having an excellent thermal conductivity. In the present embodiment, the emboss belt 13 is made of nickel steel and has on its surface an emboss shape (geographic design) 13a in which grooves of a triangle shape in section (prism shape) are arranged consecutively. A prism apex angle is not limited particularly, and it may be considered preferable for example, to be 120° or smaller, and 90°. The emboss belt 13 is preferable to be seamless (no junction). The emboss belt is preferably formed by growing nickel steel by electroforming on a tubular resin master having an emboss shape on the inner surface side, or by winding around a roll and directly performing precision cutting processing, but the present application is not limited only to these methods.

An extension direction (ridge direction) of the emboss shape 13a is set to be a width direction (transverse direction (TD)) of the resin sheet 10 in the present embodiment, but the direction is not limited to this, and may be a running direction (machine direction (MD)) of the resin sheet 10. In order to improve detachability with the resin sheet 1, mold release agent may be coated on the surface on which the emboss shape 13a is formed with respect to the emboss belt 13. The mold release agent is preferably fluoride-containing resin, silicon-containing resin or the like.

Figure 9A:
FIGS. 9A to 9E are diagrams showing examples of an emboss shape formed on the surface of a resin sheet.
Figure 9B:
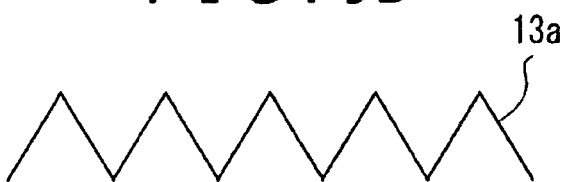
Figure 9C:
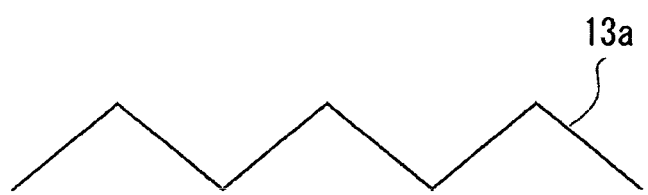
Figure 9D:
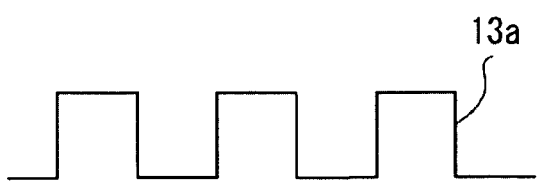
Figure 9E:

The emboss shape 13a is not limited to a triangle shape in section (prism shape). An apex angle of the prism shape is not limited to 90° as shown in FIG. 9A, but the apex angle may be an acute angle smaller than 90° as shown in FIG. 9B, or an obtuse angle larger than 90° as shown in FIG. 9C. The emboss shape 13a may be a rectangle wave (pulse wave) shape as showing in FIG. 9D or a trapezoid shape as shown in FIG. 9E. Shapes can be formed even to the emboss shape having at least one corner (sharp edge) described above at a high transfer rate.

The emboss shape may be various lens shapes. The lens shape may be either a cylindrical shape or an array shape. The lens surface may be a curved shape such as a spherical surface or an aspheric surface, or a composite shape constituted of a plurality of curved shapes not limited to the continuous curved shape.

The nip roll 15 is provided so that the roll in cooperation with the emboss belt 13 sandwiches and compresses the resin sheet 10 and transfers the emboss shape 13a on the surface of the emboss belt 13 to the surface of the resin sheet 10. In the present embodiment, as similar to the heating roll 11, the nip roll 15 has a built-in heating source and has a function of heating the resin sheet 10 on the emboss belt 13 from the rear side as an assist roll. Although the circumferential surface of the nip roll 15 is a flat smooth surface, a predetermined emboss shape may be formed on the circumferential surface of the nip roll 15 to enable transferring of shapes to the rear side of the resin sheet 10. The nip roll 15 may be a cooling roll having a cooling mechanism in order to assist detachment of the rear side and prevent transfer of the shape of the rear roll.

A nip pressure applied to the resin sheet 10 by the nip roll 15 and emboss belt 13 largely influences a transfer precision of the emboss shape 13a to the resin sheet 10. In the present embodiment, the nip pressure is set to be a line pressure of 5 kg/cm or higher and 30 kg/cm or lover. If the nip pressure is lower than 5 kg/cm, a transfer precision of the emboss shape 13a to the resin sheet 10 is lowered, whereas if the nip pressure exceeds 30 kg/cm, durability of the nip roll 15 and emboss belt 13 is adversely affected and stable production becomes difficult.

The opposing roll 16 is mounted as an auxiliary roll usable when the resin sheet 10 is detached from the emboss belt 13 on the cooling roll 12. As similar to the cooling roll 12, the opposing roll 16 has a built-in cooling means to maintain a surface temperature similar to that of the cooling roll 12 and provided with a function of cooling the resin sheet 10 from the rear side. The circumferential surface of the opposing roll 16 has a flat smooth surface. A nip pressure applied to the resin sheet 10 by the opposing roll 16 and emboss belt 13 is not specifically limited, but it is sufficient if a nip pressure makes the circumferential surface of the opposing roll 16 tightly contact the rear surface of the resin sheet 10.

The material of the resin sheet 10 is not specifically limited as long as it is transparent thermoplastic crystalline resin. In the present embodiment, polyethylene terephthalate (PET), polyethylene napthalate (PEN), mixture or copolymer of these is used which is crystalline resin undergoing far severe manufacture conditions during the cooling process for maintaining an amorphous state. The present embodiment adopts a method of forming the amorphous state resin sheet 10 in an elongated stripe shape and continuously feeding it to the sheet manufacture apparatus 1. Alternatively, a method may be adopted by which a resin sheet 10 cut in a predetermined size is sequentially fed one after another to the sheet manufacture apparatus 1.

The resin sheet 10 of the amorphous state here means that a crystallization rate is, for example, 3% or less. The sheet manufacture apparatus 1 of present embodiment executes a process of embossing the surface of the amorphous state resin sheet 10 by using the emboss belt 13, and rapidly cooling the resin sheet to manufacture the amorphous state resin sheet (emboss sheet or prism sheet) 10 having a crystallization rate of 20% or less, or preferably 10% or less. If the crystallization rate exceeds 20%, degradation of transparency caused by whitening becomes prominent and the resin sheet becomes unsuitable for use as an optical sheet.

If the crystallization rate exceeds 20%, a Young's modulus of material becomes typically high. Therefore, if the resin sheet subjected to the emboss processing is thereafter subject to stretch processing, a load required for stretching becomes large and a heating temperature during stretching is required to be set high. If the resin sheet is given a birefringence by a stretching process in particular and if the resin sheet before stretching has a crystallization rate exceeding 20%, a desired birefringence is hard to be obtained.

In order to maintain the amorphous state of the resin sheet 10 before and after processing the emboss shape on the resin sheet 10, a cooling speed [° C./sec] of the resin sheet 10 becomes an important issue during the period from the shape transfer to the resin sheet 10 on the heating roll 11 to the detachment of the resin sheet 10 on the cooling roll 12. Although depending upon the material of the resin sheet 10, the cooling speed is preferably set not slower than 5° C./sec and not faster than 40° C./sec, and more preferably not slower than 10° C./sec and not faster than 30° C./sec. If the cooling speed is slower than 5° C./sec, it is not possible to prevent excessive crystallization of the resin sheet, resulting in whitening (lost transparency). If the cooling speed is set to be faster than 40° C./sec, emboss working is degraded and obtaining of excellent morphology transfer becomes difficult. By realizing the cooling speed in the range described above, it becomes possible to suppress an increase in the crystallization rate of the resin sheet to 5% or less before and after execution of the emboss shape transfer process by the sheet manufacture apparatus 1. It is also possible to suppress the crystallization rate of the resin sheet detached from the emboss belt to 20% or less.

in order to realize the cooling speed of the resin sheet 10, the sheet manufacture apparatus 1 has a specified inter-roll distance between the heating roll 11 and cooling roll 12, a feeding speed of the endless belt 13, a contact angle of the resin sheet 10 relative to the cooling roll 12 and the like. A plurality of cooling rolls 12 may be provided.

If the distance between the rolls 11 and 12 is too long, it is necessary to increase a feeding speed of the endless belt 13 to ensure the cooling speed. However, as the feeding speed of the endless belt 13 is increased, running stability of the resin sheet 10 is lowered. Therefore, it becomes difficult to expect stable productivity or preheating becomes insufficient and transfer performance is lowered. If the distance between the rolls 11 and 12 is too short, heat exchange of the endless belt 13 becomes insufficient, and accordingly it is difficult to execute the heating and cooling processes for the resin sheet 10 at desired temperatures.

In a preferred example when the temperature of the heating roll 11 is set to be not lower than Tg+60° C. and not higher than Tg+90° C., when the temperature of the cooling roll 12 is set to be 30° C., and the feeding speed of endless belt 13 is set to be 5 m/min, the inter-roll distance between the heating roll 11 and cooling roll 12 is set to be not shorter than 100 mm and not longer than 400 mm. This inter-roll distance varies depending on the material of the resin sheet 10. For example, the inter-roll distance is not shorter than 100 mm and not longer than 200 mm for PET, and not shorter than 100 mm and not longer than 400 mm for PEN. The inter-roll distance of 100 mm corresponds to the cooling speed of 20° C./sec at 5 m/min, and the inter-roll distance of 400 mm corresponds to the cooling speed of 5° C./sec.

It is evident that a necessary cooling speed can be obtained by changing the feeding speed of the emboss belt 13 while keeping a distance between the rolls 11 and 12 constant. In this case, a preferred feeding speed is not slower than 5 m/min and not faster than 10 m/min at the distance of 800 mm between the rolls 11 and 12.

In order to stably retain the cooling conditions, it is preferable to set the total thickness of the resin sheet 10 to be 500 μm or thinner. A ratio of the emboss shape height to the total thickness of the resin sheet 10 is preferably 90% or lower. If the height ratio exceeds 90%, cracks or the like are caused in the resin sheet 10, and handling performance is lowered.

Next, description will be made on the optical sheet manufacture method of the present embodiment using the sheet manufacture apparatus 1 constructed as above.

The amorphous state resin sheet 10 preset to a supply roll (not shown) is supplied between the emboss belt 13 and nip roll 15. Next, the resin sheet 10 is heated up to a temperature corresponding to the glass transition temperature or higher on the heating roll 11, and sandwiched and compressed between the emboss belt 13 and nip roll 15 to transfer the emboss shape 13a of the emboss belt 13 on the surface of the resin sheet 10.

The resin sheet 10 to which emboss shape is transferred is fixed to the emboss belt 13 and fed toward the cooling roll 12, together with the emboss belt 13. The resin sheet 10 is cooled down to a temperature lower than the glass transition temperature on the cooling roll 12 together with the emboss belt 13. During this cooling process, after the emboss shape is transferred, the resin sheet 10 is rapidly cooled at the cooling speed in which the amorphous state is maintained. The cooled resin sheet 10 is detached from the emboss belt 13 after passing the nip point between the emboss belt 13 and opposing roll 16, to be wound around a winding roll (not shown).

In this manner, the amorphous state resin sheet 10 formed with the emboss shape 10a on the surface is manufactured. By using the sheet manufacture apparatus 1 constructed as above, the resin sheet 10 is subject to the embossing processing so that manufacture facilities can be simplified to attain cost down. Since the emboss sheet can be manufactured continuously, a manufacture efficiency can be improved.

In the present embodiment, the emboss processing is performed to the resin sheet 10 at the temperature corresponding to the glass transition temperature or higher thereof, and thereafter the resin sheet is rapidly cooled to the temperature lower than the glass transition temperature. Therefore, it is possible to maintain the amorphous state while suppressing crystallization of the resin sheet 10. Furthermore, the emboss processing is performed to the resin sheet 10 by using the emboss belt 13, the resin sheet 10 is cooled in combination with the emboss belt 13 during the term between the transfer process and the cooling process, and the resin sheet 10 is detached from the emboss belt 13 at the temperature lower than the glass transition temperature of the resin sheet. Therefore, emboss shape transfer performance and detach performance with respect to the resin sheet 10 can be improved.

According to the present embodiment, a desired emboss shape can be formed on the sheet surface at a high transfer rate while suppressing whitening caused by crystallization of the amorphous state crystalline resin sheet 10. Particularly, in the present embodiment, the emboss shape can be transferred to the resin sheet 10 at a high transfer rate of 98% or higher.

Figure 2A:
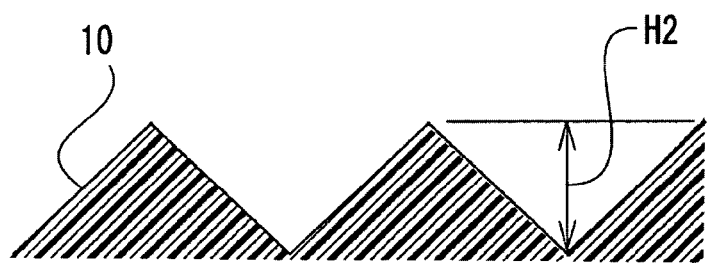
FIGS. 2A and 2B are enlarged cross sectional views showing main portions of an emboss belt and an emboss forming plane of a resin sheet of the sheet manufacture apparatus shown in FIG. 1.
Figure 2B:
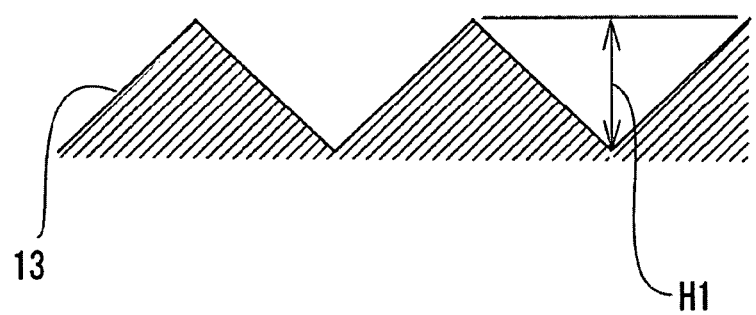

The transfer rate is defined in this specification as follow. Namely, as shown in FIGS. 2A and 2B, the transfer rate (%) is represented by (H2/H1)×100 when H2 represents an emboss shape height formed on the resin sheet 10 and H1 represents an emboss shape height formed on the emboss belt 13.

Figure 3:
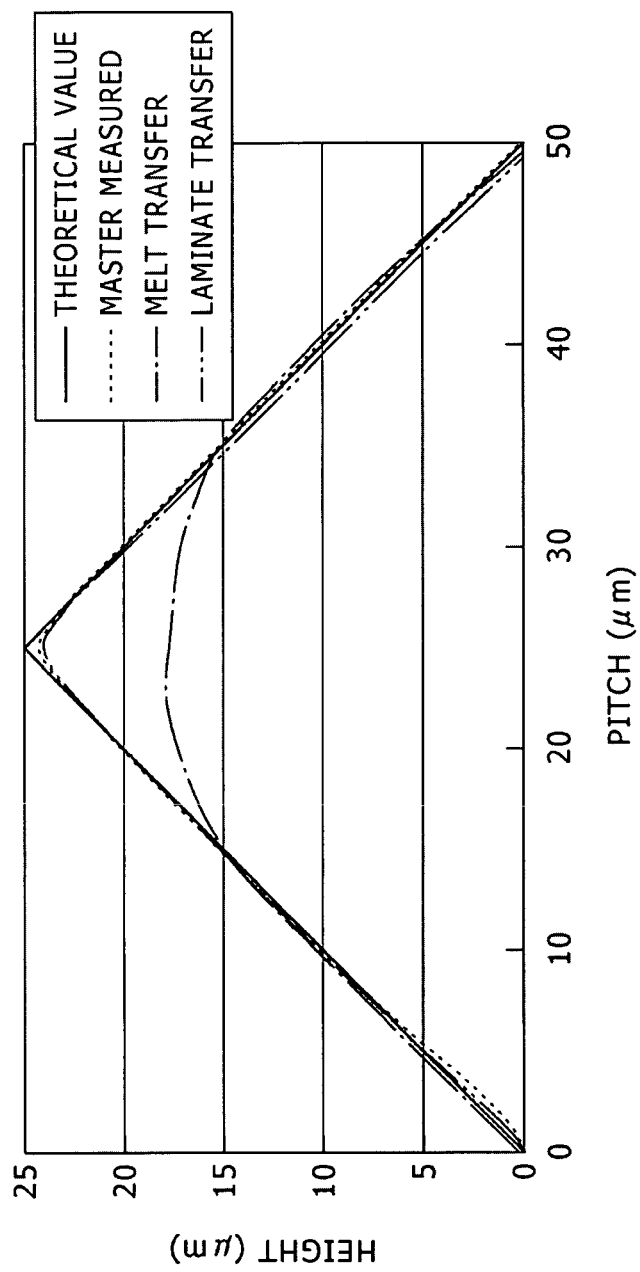
FIG. 3 is a graph of experiment results explaining a difference of pattern transfer performance between pattern transfer by a laminate method and pattern transfer by a melt extrusion method.

The actual emboss shapes of resin sheets were measured by an embossing method using melt extrusion style and an embossing method using laminate style of an embodiment, by using the master with an emboss shape of an isosceles triangle in section having an apex angle of 90° disposed at a pitch of 50 μm. The measurement results are shown in FIG. 3. It is uncovered that compared to the melt extrusion style, the laminate style can form the emboss shape at a higher transfer rate.

The in-plane temperature uniformity of the emboss belt 13 largely influences a working precision of the shape formed on the surface of the resin sheet. In the present embodiment, a roll temperature of the central portion of the heating roll 11 is set to be higher than opposite end portions, and a roll temperature of the central portion of the cooling roll 12 is set to be lower than opposite end portions. It is therefore possible to improve an in-plane temperature uniformity of the emboss belt 13 and manufacture an emboss sheet having an excellent morphology precision.

Figure 4:
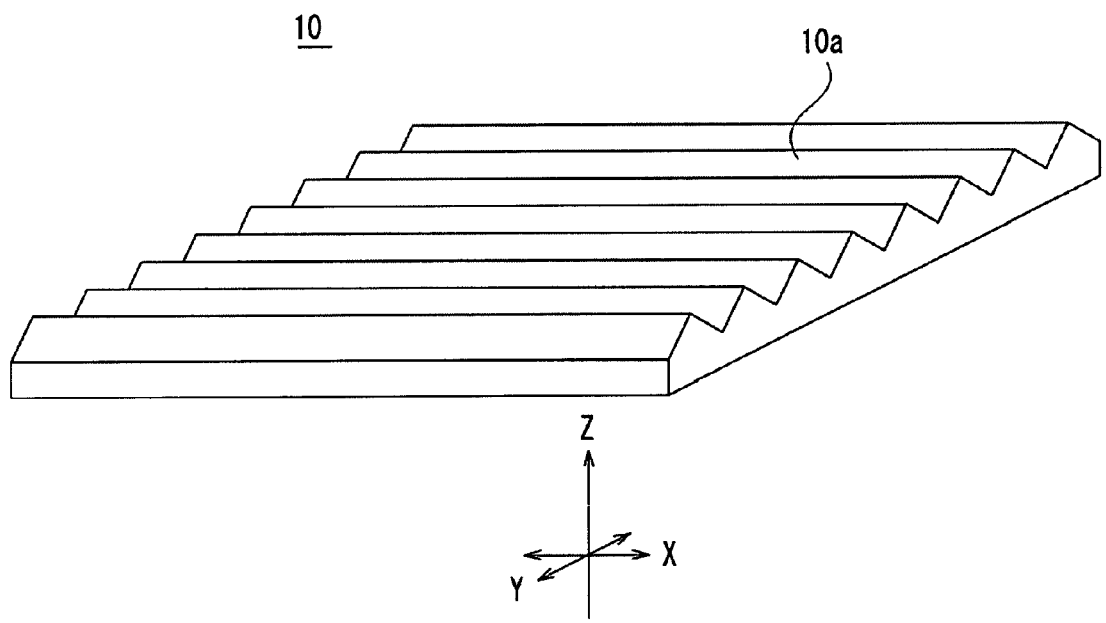
FIG. 4 is a perspective view showing the overall structure of a resin sheet (optical sheet) manufactured by the sheet manufacture apparatus shown in FIG. 1.

The resin sheet 10 formed with the emboss shape in the manner described above is cut into a predetermined size and used as an optical sheet having the target optical characteristics. FIG. 4 shows schematically the structure of a resin sheet 11 used as a prism sheet of a liquid crystal display apparatus. A prism pattern (emboss shape) 10a having a ridge direction along an X-axis direction is consecutively arranged along a Y-axis direction at a predetermined pitch on the surface of the resin sheet 10. The resin sheet 10 can be used in this state as a prism sheet of a liquid crystal display apparatus.

If the resin sheet 10 shown in FIG. 4 is stretched at a predetermined stretch rate along the prism ridge direction (X-axis direction), the sheet optical characteristics can be changed. Namely, a refractive index difference can be made between an in-plane refractive index (nx) along the X-axis direction and an in-plane refractive index (ny) along the Y-axis direction by executing the stretching process. The stretching process can be executed properly and at a high precision because the resin sheet 10 is in the amorphous state having a crystallization rate of 20% or less.

In the present embodiment, resin material such as PET and PEN having a large refractive index along the stretching direction is used as the material of the resin sheet 10, and the resin sheet 10 is given refractive index anisotropy of nx>ny by the stretching process. The resin sheet 10 constructed as above has the optical characteristics that an output light amount of polarized components along the prism array direction is larger than output light amount of polarized components along the prism extension direction, because the polarized components along the prism ridge direction (X-axis direction) have an amount of light returned back to the light incidence side by repetition of total reflection at a critical angle reflection at the prism slanted surface, which is larger than the polarized components along the prism arrays direction (Y-axis direction) with respect to prism form surface of output light.

Figure 5:
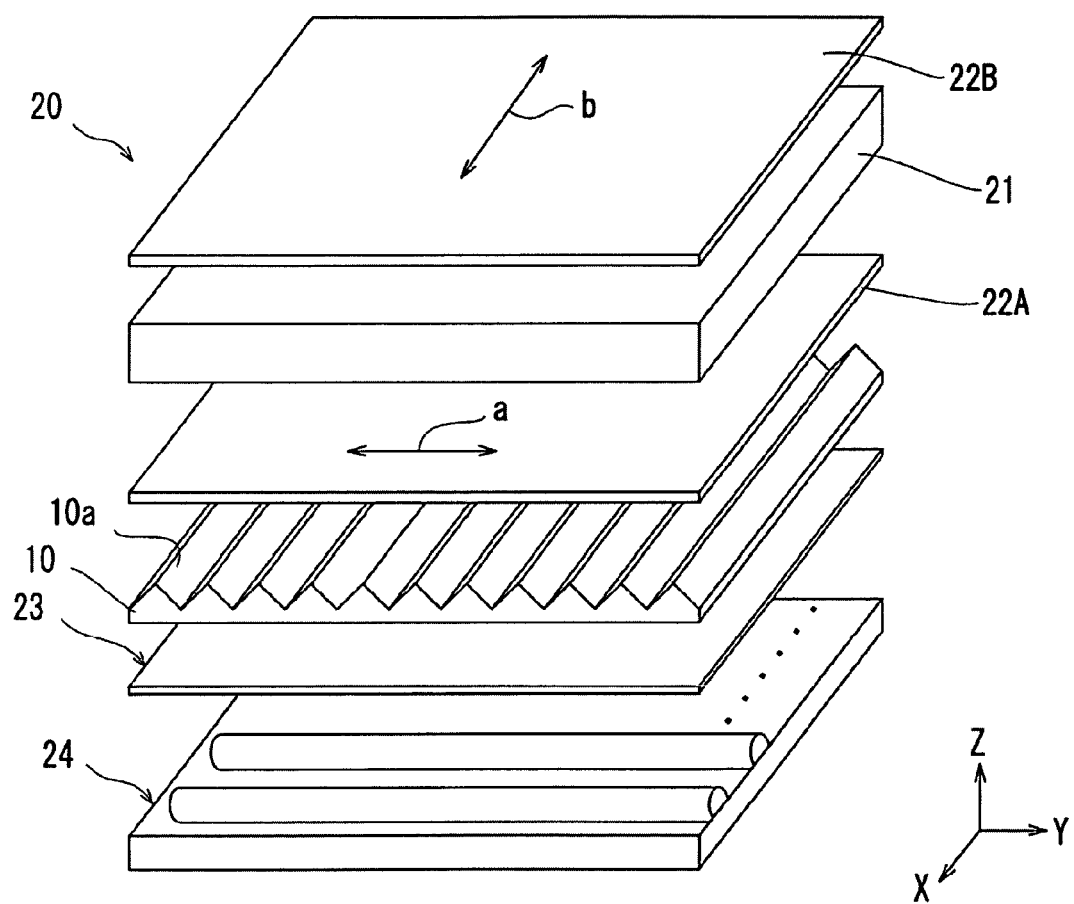
FIG. 5 is a diagram showing the outline structure of a liquid crystal displays apparatus using the optical sheet shown in FIG. 4 as a prism sheet.

FIG. 5 is a schematic diagram showing the structure of a liquid crystal display apparatus 20 using the resin sheet 10 having the structure as a prism sheet. The liquid crystal display apparatus 20 has a liquid crystal display panel 21, first and second polarizers 22A and 22B sandwiching the liquid crystal display panel 21, a prism sheet 10, a diffusion sheet 23 and a backlight unit 24.

The prism sheet 10 corresponds to the resin sheet 10 formed with the emboss shape by the sheet manufacture apparatus 1, and is used as a luminance improving film for improving a front luminance of the liquid crystal displays apparatus 20. The prism sheet 10 is disposed at the light output side of the diffusion sheet 23 for diffusing and outputting illumination light (backlight) from the backlight unit 24, and has a function of converging output light from the diffusion sheet 23 to the front direction.

A pair of polarizers 22A and 22B sandwiching the liquid crystal display panel 11 is disposed such that their transmission axes "a" and "b" become orthogonal. In the example shown, the prism sheet 10 is disposed in such a manner that the prism arrangement direction (Y-axis direction) of the prism sheet 10 becomes approximately parallel to the transmission axis "a" of the first polarizer 22A positioned on the side of the backlight unit 24. This example is particularly effective when the prism sheet 10 stretched along the prism ridge direction (X-axis direction) is used. Since polarized components having a large output light amount can be effectively entered to the liquid crystal display panel 21, the front luminance can be improved.

The prism sheet 10 is not limited to a single prism sheet structure, but a plurality of prism sheets may be laminated. In this case, it is preferable that prism sheets are laminated while ridge direction of respective prism sheets is made perpendicular to each other.

Second Embodiment

Next, the second embodiment will be described. FIG. 6 is a schematic diagram showing the structure of a sheet manufacture apparatus 2 of the second embodiment. In FIG. 6, parts corresponding parts of the first embodiment are represented by using identical reference symbols, and the detailed description thereof is omitted.

In the sheet manufacture apparatus 2 of the second embodiment, a metal endless belt 14 is wound around a nip roll 15 and an opposing roll 16 facing the rear side (side where an emboss shape is not formed) of a resin sheet 10. The resin sheet 10 is sandwiched and compressed between an emboss belt 13 and the endless belt 14 during a period from a heating/transferring process to a cooling/detaching process of the resin sheet 10.

Although the endless belt 14 is made of metal such as nickel steel, the material is not limited to metal but heat resistance resin such as heat resistant PET may be used. The surface of the endless belt 14 is a mirror surface. If necessary, a shape may be formed so that the shape can be transferred and formed to the rear surface of the resin sheet 10.

Although depending upon the material, a thickness of the endless belt 14 is preferably not thinner than 30 μm and not thicker than 1000 μm. If a thickness exceeds 1000 μm, it is not possible to wind the endless belt around the heating roll and cooling roll. If a thickness is thinner than 30 μm, warp is likely caused during feeding of the resin sheet 10 or cracks are caused to pose a problem in terms of strength.

In the sheet manufacture apparatus 2 of the second embodiment constructed as above, the resin sheet 10 is transported in a state that the sheet is sandwiched and held between the emboss belt 13 and endless belt 14, during the time period from the heating/transferring process to the cooling/detaching process of the resin sheet 10. It is therefore possible to improve running stability of the resin sheet 10 so that the setting flexibility of the cooling speed for preventing whitening caused by crystallization of the resin sheet 10 can be improved by speeding up the feeding speed.

According to the second embodiment, by performing emboss processing to the surface of the endless belt 14 and forming an emboss shape thereon, the emboss shape can be formed at a high transfer precision not only on the front surface but also on the rear surface of the resin sheet 10.

Third Embodiment

FIG. 7 illustrates the manufacture of a laminate sheet 10L by thermally bonding two resin sheets 10s and 10t by using the sheet manufacture apparatus 2. In this example, while the emboss shape is transferred to a surface of the resin sheet 10s by the emboss belt 13, the two resin sheets 10s and 10t are sandwiched and compressed between the emboss belt 13 and endless belt 14 to be thermally bonded and integrated together. Thus, it becomes possible to easily manufacture the laminate sheet 10L having a predetermined emboss shape formed on the surface thereof.

The two resin sheets 10s and 10t are fed to the sheet manufacture apparatus 2 together. The resin sheets 10s and 10t may be made of the same kind of resin sheets or may include different types of resin sheets. Moreover, three or more resin sheets may be fed at the same time.

Example 1

An amorphous PET sheet (Tg: about 75° C.) of 200 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 200 μm
Prism pitch: 50 μm
Surface temperature of heating roll 11: 150° C.
Surface temperature of nip roll 15: 50° C.
Surface temperature of cooling roll 12: 30° C.
Surface temperature of opposing roll 16: 30° C.
Cooling speed of resin sheet: 20° C./sec
(Sheet Feeding Speed: 5 m/min)
Nip line pressure between heating roll 11 and nip roll 15: 15 kg/cm Example 2

An amorphous PEN sheet (Tg: about 120° C.) of 200 μm thick was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 200 μm
Prism pitch: 100 μm
Surface temperature of heating roll 11: 190° C.
Surface temperature of nip roll 15: 70° C.
Surface temperature of cooling roll 12: 30° C.
Surface temperature of opposing roll 16: 30° C.
Cooling speed of resin sheet: 10° C./sec
(Sheet feeding speed: 3 m/min)
Nip line pressure between heating roll 11 and nip roll 15: 15 kg/cm Example 3

An amorphous PEN sheet (Tg: about 120° C.) of 200 μm thickness was formed by a T die extrusion method. The amorphous PEN sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 200 μm
Prism pitch: 300 μm
Surface temperature of heating roll 11: 190° C.
Surface temperature of nip roll 15: 70° C.
Surface temperature of cooling roll 12: 30° C.
Surface temperature of opposing roll 16: 30° C.
Cooling speed of resin sheet: 10° C./sec
(Sheet Feeding Speed: 3 m/min)
Nip line pressure between heating roll 11 and nip roll 15: 15 kg/cm Example 4

An amorphous PEN sheet (Tg: about 120° C.) of 200 μm thickness was formed by a T die extrusion method. The amorphous PEN sheet was fed to the sheet manufacture apparatus 1 or 2, and a prism sheet having a number of prisms of an manufactured under the following conditions.

[Manufacture Conditions]
Sheet material: amorphous PEN
Thickness: 200 μm
Prism pitch: 10 μm
Surface temperature of heating roll 11: 190° C.
Surface temperature of nip roll 15: 70° C.
Surface temperature of cooling roll 12: 30° C.
Surface temperature of opposing roll 16: 30° C.
Cooling speed of resin sheet: 10° C./sec
(Sheet feeding speed: 3 m/min)
Nip line pressure between heating roll 11 and nip roll 15: 15 kg/cm

Example 5

An amorphous PET sheet (Tg: about 75° C.) of 500 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 500 μm
Prism pitch: 100 μm
Surface temperature of heating roll 11: 150° C.
Surface temperature of nip roll 15: 50° C.
Surface temperature of cooling roll 12: 30° C.
Surface temperature of opposing roll 16: 30° C.
Cooling speed of resin sheet: 15° C./sec
(Sheet Feeding Speed: 5 m/min)
Nip line pressure between heating roll 11 and nip roll 15: 15 kg/cm

Example 6

An amorphous PET sheet (Tg: about 75° C.) of 20 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 20 μm
Prism pitch: 20 μm
Surface temperature of heating roll 11: 150° C.
Surface temperature of nip roll 15: 50° C.
Surface temperature of cooling roll 12: 30° C.
Surface temperature of opposing roll 16: 30° C.
Cooling speed of resin sheet: 30° C./sec
(Sheet feeding speed: 5 m/min)
Nip line pressure between heating roll 11 and nip roll 15: 30 kg/cm

Example 7

An amorphous PEN sheet (Tg: about 120° C.) of 200 μm thickness was formed by a T die extrusion method. The amorphous PEN sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 200 μm
Prism pitch: 50 μm
Surface temperature of heating roll 11: 200° C.
Surface temperature of nip roll 15: 70° C.
Surface temperature of cooling roll 12: 50° C.
Surface temperature of opposing roll 16: 50° C.
Cooling speed of resin sheet: 40° C./sec
(Sheet Feeding Speed: 5 m/min)
Nip line pressure between heating roll 11 and nip roll 15: 30 kg/cm

Example 8

An amorphous PEN sheet (Tg: about 120° C.) of 150 μm thickness was formed by a T die extrusion method. The amorphous PEN sheet was fed to the sheet manufacture apparatus 1 or 2 and a prism sheet having a number of prisms of an isosceles triangle having an apex angle of 90° arrayed on the sheet surface was manufactured under the following conditions.

[Manufacture Conditions]
Sheet material: amorphous PEN
Thickness: 150 μm
Prism pitch: 100 μm
Surface temperature of heating roll 11: 180° C.
Surface temperature of nip roll 15: 70° C.
Surface temperature of cooling roll 12: 30° C.
Surface temperature of opposing roll 16: 30° C.
Cooling speed of resin sheet: 30° C./sec
(Sheet feeding speed: 5 m/min)
Nip line pressure between heating roll 11 and nip roll 15: 30 kg/cm

Example 9

An amorphous PEN sheet (Tg: about 120° C.) of 200 μm thickness was formed by a T die extrusion method. The amorphous PEN sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 200 μm
Prism pitch: 350 μm
Surface temperature of heating roll 11: 190° C.
Surface temperature of nip roll 15: 70° C.
Surface temperature of cooling roll 12: 30° C.
Surface temperature of opposing roll 16: 30° C.
Cooling speed of resin sheet: 10° C./sec
(Sheet Feeding Speed: 3 m/min)
Nip line pressure between heating roll 11 and nip roll 15: 15 kg/cm

Example 10

An amorphous PEN sheet (Tg: about 120° C.) of 300 μm thickness was formed by a T die extrusion method. The amorphous PEN sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 300 μm
Prism pitch: 75 μm
Surface temperature of heating roll 11: 190° C.
Surface temperature of nip roll 15: 70° C.
Surface temperature of cooling roll 12: 30° C.
Surface temperature of opposing roll 16: 30° C.
Cooling speed of resin sheet: 10° C./sec
(Sheet Feeding Speed: 4 m/min)
Nip line pressure between heating roll 11 and nip roll 15: 5 kg/cm

Example 11

An amorphous PET sheet (Tg: about 75° C.) of 300 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 100 μm
Prism pitch: 100 μm
Surface temperature of heating roll 11: 150° C.
Surface temperature of nip roll 15: 50° C.
Surface temperature of cooling roll 12: 30° C.
Surface temperature of opposing roll 16: 30° C.
Cooling speed of resin sheet: 25° C./sec
(Sheet Feeding Speed: 5 m/min)
Nip line pressure between heating roll 11 and nip roll 15: 5 kg/cm Example 12

An amorphous PET sheet (Tg: about 75° C.) of 100 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 100 μm
Prism pitch: 100 μm
Surface temperature of heating roll 11: 150° C.
Surface temperature of nip roll 15: 50° C.
Surface temperature of cooling roll 12: 30° C.
Surface temperature of opposing roll 16: 30° C.
Cooling speed of resin sheet: 6° C./sec
(Sheet Feeding Speed: 2 m/min)
Nip line pressure between heating roll 11 and nip roll 15: 20 kg/cm Example 13

An amorphous PEN sheet (Tg: about 120° C.) of 300 μm thickness was formed by a T die extrusion method. The amorphous PEN sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 300 μm
Prism pitch: 50 μm
Surface temperature of heating roll 11: 190° C.
Surface temperature of nip roll 15: 80° C.
Surface temperature of cooling roll 12: 60° C.
Surface temperature of opposing roll 16: 60° C.
Cooling speed of resin sheet: 5° C./sec
(Sheet Feeding Speed: 3 m/min)
Nip line pressure between heating roll 11 and nip roll 15: 20 kg/cm Comparative Example 1

An amorphous PET sheet (Tg: about 75° C.) of 200 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 200 μm
Prism pitch: 100 μm
Surface temperature of heating roll 11: 170° C.
Surface temperature of nip roll 15: 40° C.
Surface temperature of cooling roll 12: 30° C.
Surface temperature of opposing roll 16: 30° C.
Cooling speed of resin sheet: 3° C./sec
(Sheet Feeding Speed: 4 m/min)
Nip line pressure between heating roll 11 and nip roll 15: 15 kg/cm Comparative Example 2

An amorphous PEN sheet (Tg: about 120° C.) of 200 μm thickness was formed by a T die extrusion method. The amorphous PEN sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 200 μm
Prism pitch: 100 μm
Surface temperature of heating roll 11: 170° C.
Surface temperature of nip roll 15: 60° C.
Surface temperature of cooling roll 12: 30° C.
Surface temperature of opposing roll 16: 30° C.
Cooling speed of resin sheet: 20° C./sec
(Sheet Feeding Speed: 5 m/min)
Nip line pressure between heating roll 11 and nip roll 15: 15 kg/cm Comparative Example 3

An amorphous PEN sheet (Tg: about 120° C.) of 560 μm thickness was formed by a T die extrusion method. The amorphous PEN sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PEN
Thickness: 560 μm
Prism pitch: 200 μm
Surface temperature of heating roll 11: 190° C.
Surface temperature of nip roll 15: 80° C.
Surface temperature of cooling roll 12: 30° C.
Surface temperature of opposing roll 16: 30° C.
Cooling speed of resin sheet: 3° C./sec
(Sheet Feeding Speed: 2 m/min)
Nip line pressure between heating roll 11 and nip roll 15: 15 kg/cm Comparative Example 4

An amorphous PET sheet (Tg: about 75° C.) of 200 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 200 μm
Prism pitch: 50 μm
Surface temperature of heating roll 11: 150° C.
Surface temperature of nip roll 15: 40° C.
Surface temperature of cooling roll 12: 30° C.
Surface temperature of opposing roll 16: 30° C.
Cooling speed of resin sheet: 10° C./sec
(Sheet Feeding Speed: 4 m/min)
Nip line pressure between heating roll 11 and nip roll 15: 3 kg/cm Comparative Example 5

An amorphous PET sheet (Tg: about 75° C.) of 200 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 200 μm
Prism pitch: 50 μm
Surface temperature of heating roll 11: 150° C.
Surface temperature of nip roll 15: 40° C.
Surface temperature of cooling roll 12: 30° C.
Surface temperature of opposing roll 16: 30° C.
Cooling speed of resin sheet: 10° C./sec
(Sheet Feeding Speed: 4 m/min)
Nip line pressure between heating roll 11 and nip roll 15: 35 kg/cm Comparative Example 6

An amorphous PET sheet (Tg: about 75° C.) of 200 μm thickness was formed by a T die extrusion method. The amorphous PET sheet was fed to the sheet manufacture apparatus 1 or 2, and a prism sheet having a number of prisms of an manufactured under the following conditions.

[Manufacture Conditions]
Sheet material: amorphous PET
Thickness: 200 μm
Prism pitch: 50 μm
Surface temperature of heating roll 11: 150° C.
Surface temperature of nip roll 15: 40° C.
Surface temperature of cooling roll 12: 80° C.
Surface temperature of opposing roll 16: 80° C.
Cooling speed of resin sheet: 10° C./sec
(Sheet feeding speed: 3 m/min)
Nip line pressure between heating roll 11 and nip roll 15: 15 kg/cm Comparative Example 7

An amorphous PET sheet (Tg: about 75° C.) of 100 μm thickness was formed by a T die extrusion method. The amorphous PET sheet was fed to the sheet manufacture apparatus 1 or 2, and a prism sheet having a number of prisms of an isosceles triangle having an apex angle of 90° arrayed on the sheet surface was manufactured under the following conditions.

[Manufacture Conditions]
Sheet material: amorphous PET
Thickness: 100 μm
Prism pitch: 185 μm
Surface temperature of heating roll 11: 150° C.
Surface temperature of nip roll 15: 40° C.
Surface temperature of cooling roll 12: 50° C.
Surface temperature of opposing roll 16: 50° C.
Cooling speed of resin sheet: 10° C./sec
(Sheet Feeding Speed: 3 m/min)
Nip line pressure between heating roll 11 and nip roll 15: 15 kg/cm Comparative Example 8

An amorphous PET sheet (Tg: about 75° C.) of 200 μm thickness was formed by a T die extrusion method. The amorphous PET sheet was used to manufacture a prism sheet having a number of prisms of an isosceles triangle having an apex angle of 90° arrayed on the sheet surface by a melt extrusion method, under the following conditions.

[Manufacture Conditions]
Sheet material: amorphous PET
Thickness: 200 μm
Prism pitch: 50 μm FIG. 10 collectively shows the sheet manufacture conditions of the first to thirteenth examples and the first to eighth comparative examples.

Measured next were a prism shape transfer rate (%), radius of curvature of a prism apex (apex angle R (μm)), a prism ratio (%) of a prism height to a total thickness of the sheet, a crystallization rate (%) and a front luminance rise rate (%), respectively of samples manufactured under the manufacture conditions of the first to thirteenth examples and the first to eighth comparative examples.

The definition of the transfer rate has been described earlier. The crystallization rate was measured through density calculation by differential scanning calorimeter (DSC). The front luminance rise rate is a rise rate of a front luminance when the prism sheet sample of each of the examples and comparative examples and the diffusion sheet are provided under the following conditions: a model is a configuration of the liquid crystal display apparatus shown in FIG. 5, and the front luminance in a dark room with neither the prism sheet 10 nor the diffusion sheet 23 will be a standard (100%). The front luminance was measured by an instrument "CS-1000" manufactured by Konica Minolta Holdings, Inc.

Measurement results are shown in FIG. 11. Three-grade judging was used, and the evaluation criterion includes "□" indicating a practically superior level comparing with current products, "○" indicating a practically no problem level, and "x" indicating a practically unsatisfactory characteristics level.

As shown in FIG. 11, every sample of the first to thirteenth examples had a transfer rate of 99% or higher. The radius of curvature of the prism apex was 5% or less of the prism pitch, thereby proving an excellent transfer precision. Further, every sample had a suppressed crystallization rate of 10% or less, and no lowered transparency caused by whitening was observed. With respect to ever), sample, the front luminance of a liquid crystal display apparatus was improved by 180% or higher.

Although the first comparative example had a high transfer rate, a rise rate in the front luminance remained at 175% because the crystallization rate exceeded 20% and the transparency was lowered by whitening. This may be ascribed to factors that the surface temperature of the heating roll 11 was high (over Tg+90° C.) and a cooling speed necessary for preventing crystallization could not be obtained. Although the second comparative example was able to prevent the progress of crystallization, the transfer rate was low and a rise in the luminance was also insufficient. This may be ascribed to the factors that the surface temperature of the heating roll 11 was low (lower than Tg+60° C.), the morphology transfer was insufficient. The resin sheet of the comparative example 3 was as too thick as 560 μm, whereby the cooling speed was not sufficient, crystallization was over progressed and transmissivity was lowered due to whitening.

The fourth comparative example had insufficient morphology transfer and was not able to obtain a high rise rate of the front luminance, because the nip line pressure between the heating roll 11 and nip roll 15 was as too low as 3 kg/cm. On the other hand, with respect to the fifth comparative example, stable sheet manufacturing was not possible, because the nip line pressure was too high as 35 kg/cm. Further, with respect to the sixth comparative example, stable manufacturing of sheet was not possible, because the surface temperature of the cooling roll 12 was high (exceeding Tg) and detachment performance was poor.

The seventh comparative example had a high (over 90%) ratio of the prism height to the total sheet thickness whereby the sheet was torn along the prism ridge direction, cracks or the like was caused to have poor durability and handling, and stable production was not possible. Since morphology transfer of the eighth comparative example used melt extrusion method, a transfer rate was poor and an excellent rise in the luminance was not observed.

In the first to thirteenth examples in which the cooling speed was not slower than 5° C./sec and not faster than 40° C./sec, the surface temperature of the heating roll 11 was not lower than Tg+60° C. and not higher than Tg+90° C. and the thickness of the resin sheet is 500 μm or thinner, it was possible to prevent excessive crystallization of the sheet and the crystallization rate could be suppressed to 20% or less. Since the nip line pressure satisfied the condition of not lower than 5 kg/cm and not higher than 30 kg/cm, excellent morphology transfer performance and detach performance could be obtained to realize stable productivity.

The present application shall not be limited to the above described embodiments where various and suitable modification thereof apply. For example, a resin sheet 10 in a roll state or a resin sheet cut into sheet size is fed to the sheet manufacture apparatus 1 and 2 in the embodiments. Instead, a melt extrusion apparatus for manufacturing an amorphous state resin sheet may be installed at the front stage side of the sheet manufacture apparatus to continuously perform resin sheet manufacture and embossing.

A stretching apparatus for stretching a manufactured emboss sheet in a predetermined direction may be installed at the back stage side of the sheet manufacture apparatus to continuously perform emboss working and stretching processing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A manufacture method of an optical sheet made of a transparent thermoplastic resin sheet as a surface thereof a regular geometric design working is performed, the optical sheet manufacture method comprising:
    performing a geometric design working on the resin sheet at a temperature not lower than a glass transition temperature of the resin sheet, by using a metal endless working belt formed with a geometric design on a surface thereof, wherein the temperature not lower than a glass transition temperature is not lower than Tg+60° C. and not higher than Tg+90° C., where Tg (° C.) is the glass transition temperature of the resin sheet;
    rapidly cooling the resin sheet on which the geometric design working is performed to a temperature lower than the glass transition temperature, wherein the resin sheet is cooled at a cooling speed not slower than 5° C./sec and not higher than 40° C./sec; and
    detaching the rapidly cooled resin sheet from the metal endless working belt,
    wherein the resin sheet is made of transparent crystalline resin selected from the group consisting of PET, PEN, and a mixture or copolymer of PET and PEN and has a crystallization rate of 20% or less when the resin sheet is detached from the metal endless working belt.

2. The optical sheet manufacture method according to claim 1, wherein an increase of a crystallization rate of the resin sheet is 5% or less before and after performing the optical sheet manufacture method.

3. The optical sheet manufacture method according to claim 1, wherein a plurality of resin sheets are inputted, and the plurality of resin sheets are thermally bonded and integrated while a shape is transferred by the metal endless working belt.

4. The optical sheet manufacture method according to claim 1, wherein a total thickness of the resin sheet is 500 μm or thinner.

5. The optical sheet manufacture method according to claim 1, wherein a ratio of a height of a transferred portion to a total thickness of the resin sheet is 90% or less.

6. The optical sheet manufacture method according to claim 1, wherein the geometric design transferred to the resin sheet is an emboss shape.

7. The optical sheet manufacture method according to claim 6, wherein the emboss shape transferred to the resin sheet is a prism shape.

8. The optical sheet manufacture method according to claim 7, wherein the prism shape transferred to the resin sheet is an isosceles triangle having an apex angle of 90°.

9. The optical sheet manufacture method according to claim 8, wherein a transfer rate of the prism shape to the resin sheet is 98% or higher.

10. The optical sheet manufacture method according to claim 1, wherein the metal endless working belt is wound around a heating roll set to a temperature higher than the glass transition temperature of the resin sheet and around a cooling roll set to a temperature lower than the glass transition temperature of the resin sheet, and transferred in synchronization with rotation of the heating roll and the cooling roll.

11. The optical sheet manufacture method according to claim 10, wherein;
    the resin sheet is processed between a nip roll disposed in a manner it faces the heating roll and the metal endless working belt; and
    a nip line pressure between the metal endless working belt and the nip roll is not lower than 5 kg/cm and not higher than 30 kg/cm.

12. The optical sheet manufacture method according to claim 11, wherein;
an endless belt is wound around the nip roll and around an opposing roll facing the cooling roll; and
the resin sheet is transferred with being sandwiched and held between the metal endless working belt and the endless belt.

13. The optical sheet manufacture method according to claim 12, wherein while a shape is transferred to the resin sheet by the metal endless working belt, a shape is also transferred to an opposite side of the resin sheet by a geometric shape formed on a surface of the endless belt.

14. The optical sheet manufacture method according to claim 1, wherein the geometric design worked on the surface of the resin sheet has at least one corner.

15. The optical sheet manufacture method according to claim 10, wherein;
a roll temperature of the heating roll for transferring the resin sheet is set to be high in a central portion compared with the roll temperature in opposite end portions; and
a roll temperature of the cooling roll for transferring the resin sheet is set low in a central portion compared with the roll temperature in opposite end portions.

16. The optical sheet manufacture method according to claim 10, wherein the resin sheet is processed between a nip roll disposed in a manner it faces the heating roll and the metal endless working belt, and wherein the nip roll has a cooling mechanism.

17. The optical sheet manufacture method according to claim 10, wherein the resin sheet is processed between a nip roll disposed in a manner it faces the heating roll and the metal endless working belt, wherein while a shape is transferred to the resin sheet by the metal endless working belt, a shape is also transferred to an opposite side of the resin sheet by an emboss shape formed on a circumferential surface of the nip roll.

* * * * *